United States Patent [19]
Nobel

[11] Patent Number: 5,123,938
[45] Date of Patent: Jun. 23, 1992

[54] DEVICE FOR SEPARATING GAS FROM LIQUID AND DISCHARGING THE SEPARATED GAS

[75] Inventor: Cornelis Nobel, Schoonhoven, Netherlands

[73] Assignee: Flamco B.V., Gouda, Netherlands

[21] Appl. No.: 588,353

[22] Filed: Sep. 26, 1990

[51] Int. Cl.⁵ .............................................. B01D 19/00
[52] U.S. Cl. ........................................ 55/170; 55/159; 137/202
[58] Field of Search ................. 55/159, 170, 168, 178; 137/202

[56] References Cited

U.S. PATENT DOCUMENTS

| | | | |
|---|---|---|---|
| 1,116,931 | 11/1914 | Schutt | 137/202 |
| 1,332,997 | 3/1920 | Reibin | 137/202 |
| 1,620,155 | 3/1927 | Hilliard | 55/512 |
| 1,775,362 | 9/1930 | Demarcus | 55/170 |
| 2,577,606 | 12/1951 | Conley | 55/512 |
| 2,909,322 | 10/1959 | Blumberg | 236/66 |
| 3,018,787 | 1/1962 | Kirk | 137/202 |
| 3,079,942 | 3/1963 | Nelson | 137/315 |
| 3,335,549 | 8/1967 | Hendrix | 55/178 |
| 3,336,732 | 8/1967 | Carroll | 55/201 |
| 3,359,708 | 12/1967 | Barber | 55/170 |
| 3,775,947 | 12/1973 | Dupont et al. | 55/159 |
| 3,796,227 | 3/1974 | Fujiwara | 137/202 |
| 3,854,906 | 12/1974 | Roffelsen | 55/159 |
| 3,960,525 | 6/1976 | Coggins | 55/178 |
| 4,381,928 | 5/1983 | Roffelsen | 55/170 |
| 4,714,484 | 12/1987 | Kuhl et al. | 55/170 |

FOREIGN PATENT DOCUMENTS

| | | | |
|---|---|---|---|
| 25388 | 3/1930 | Australia | 55/170 |
| 342940 | 4/1978 | Belgium | |
| 560410 | 2/1932 | Fed. Rep. of Germany | |
| 953652 | 12/1956 | Fed. Rep. of Germany | |
| 1193379 | 5/1965 | Fed. Rep. of Germany | |
| 3208998 | 9/1982 | Fed. Rep. of Germany | |
| 3207321 | 9/1983 | Fed. Rep. of Germany | |
| 3515936 | 11/1986 | Fed. Rep. of Germany | |
| 1335096 | 7/1963 | France | |
| 19606 | 1/1929 | Netherlands | |
| 7107942 | 12/1972 | Netherlands | |

*Primary Examiner*—Bernard Nozick
*Attorney, Agent, or Firm*—Nilles & Nilles

[57] ABSTRACT

A device for separating gas from liquid, in particular for separating air from water and for discharging the separated gas, is designed for placing in a liquid circulation system through which gas-containing liquid flows. The device comprises a housing with a feed aperture and a discharge aperture for the liquid to be degassed. The internal space of the housing is at least partially filled with open filling elements which have a large surface area relative to the volume taken up. The filling elements can be the shape of hollow cylindrical elements, known per se, comprising a cylindrical wall provided with apertures, and projections extending inwards from the wall. At the top side of the housing, in the wall thereof, a valve for the discharge of the separated gas is provided. The valve is operated by a float comprising a float element and a float rod. The float is guided in a freely movable manner in the axial direction by float rod guide elements, and is provided with a valve operating element which in the nonworking position lies clear of a valve opening element connected to the valve, and for opening of the valve can cooperate with said valve opening element.

16 Claims, 6 Drawing Sheets

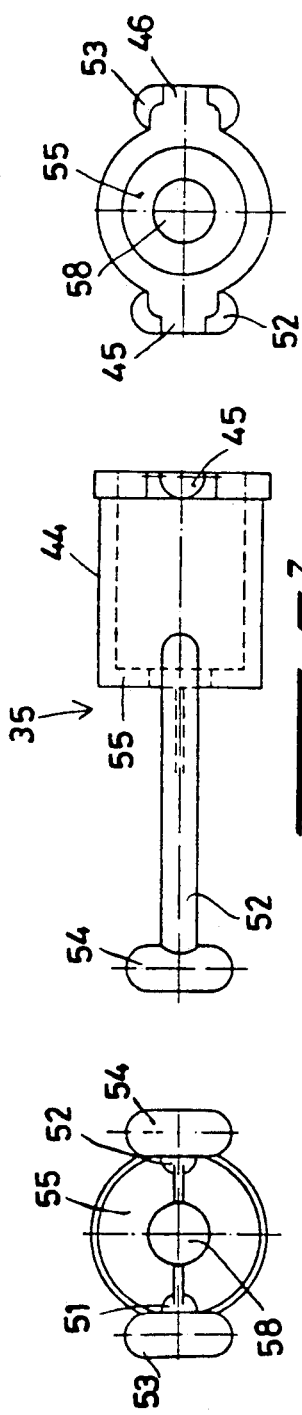
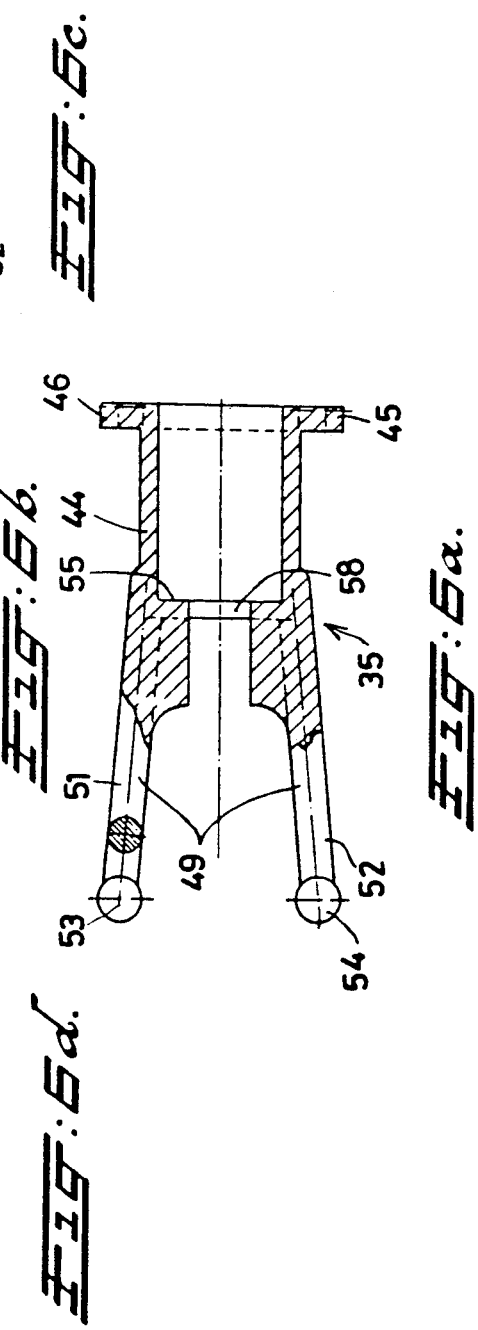
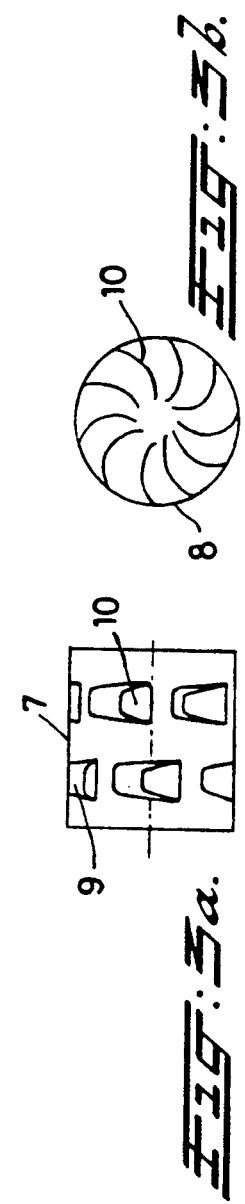

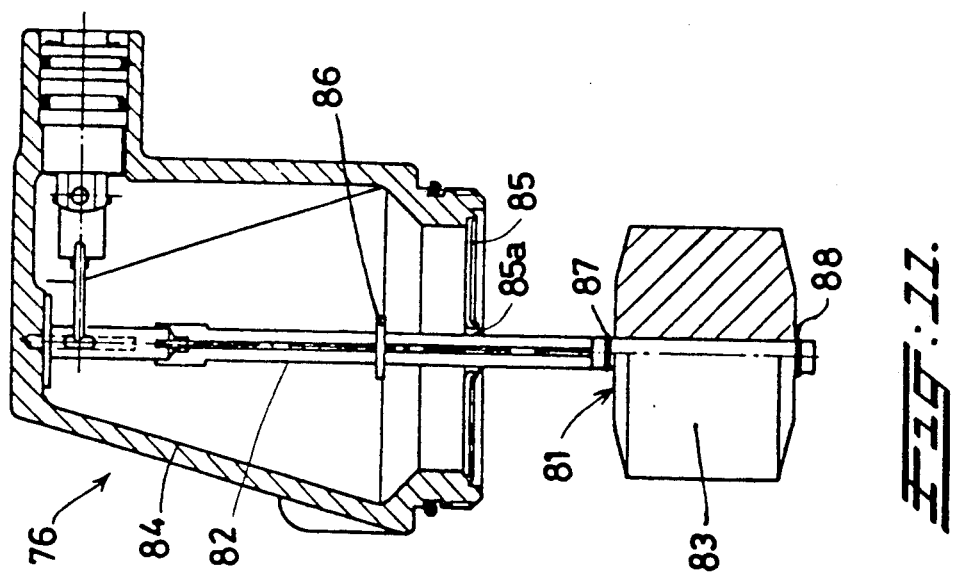
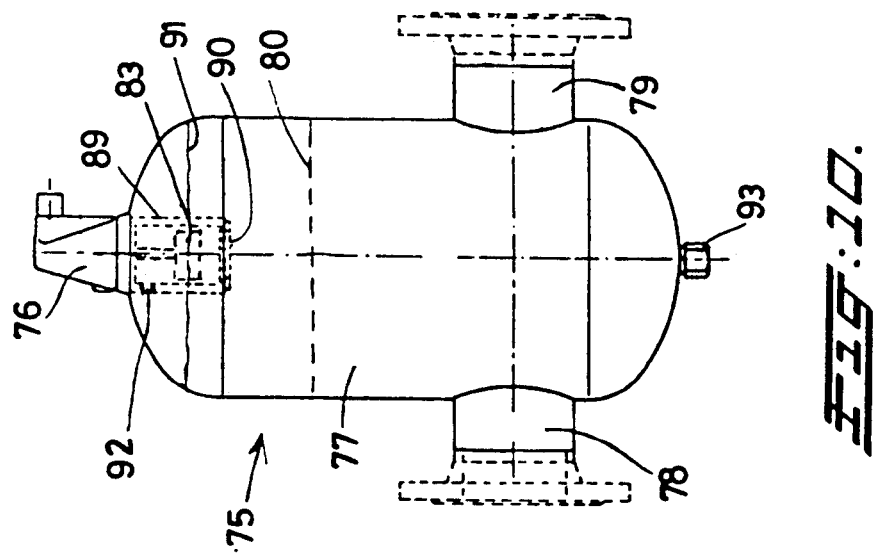

DEVICE FOR SEPARATING GAS FROM LIQUID AND DISCHARGING THE SEPARATED GAS

BACKGROUND OF THE INVENTION

The present invention relates to a device for separating gas from liquid, in particular for separating air from water, and designed for placing in a liquid circulation system through which gas-containing liquid flows, comprising a housing with a feed aperture and a discharge aperture for the liquid to be degassed, and at the top side an aperture for the discharge of the separated gas.

The invention also relates to a device for discharging gas from a closed system containing liquid and gas, in particular the discharge of air from a closed water- and air-filled system, comprising a housing which can be connected at the bottom side to the system containing liquid and gas, and a valve fitted in the wall of the housing and operated by a float, through which gas can be discharged.

Such devices are known. However, they have the disadvantage that the gas separating capacity is often inadequate, so that too much gas remains in the liquid, which can have harmful consequences for certain parts of the system through which the liquid flows, such as pumps.

The reliability of the gas discharge valve present in the device also leaves something to be desired, due to the fact that the valve is subject to soiling.

SUMMARY OF THE INVENTION

It is an object of the present invention to provide a device for separating gas from liquid which has an improved gas separating capacity.

Another object of the invention is to provide a device for separating gas from liquid and discharging the separated gas with a very reliable float operated gas discharge system The first object is achieved by a device for separating gas from liquid, of the type mentioned above, wherein the internal space of the housing is at least partially filled with open filling elements which have a large surface area relative to the volume taken up.

Through the use of open filling elements in the gas separator, which are known per se in the processing industry, but are used there for other purposes, very good gas separation is achieved, which is the result of the fact that gas present in the liquid adheres to the surface of the filling elements and there forms small bubbles, which become larger by coalescence until they have sufficient floating power to break away from the filling elements and rise up in the liquid.

The other object is achieved by a device for discharging gas from a closed system containing liquid and gas, of the type mentioned above, wherein the float comprises a float element and a float rod extending coaxially through the float element and standing vertical during operation, and the float is guided in a freely movable manner in the axial direction by float rod guide elements and is also provided with a valve operating element which in the non-working position lies clear of a valve opening element connected to the valve and upon opening of the valve can cooperate with said valve opening element.

The design of the gas discharge valve and the float system operating the gas discharge valve produces a very reliable gas discharge system, in which the risk of soiling of the valve is slight and the risk of leaks is minimized.

BRIEF DESCRIPTION OF THE DRAWINGS

FIGS. 3a and 3b show a particular embodiment of the filling elements used in the gas separator of FIGS. 1 and 2, on an enlarged scale;

FIGS. 6a–6d show the valve opening element used for the valve of FIG. 5, in top view, side view and partially in cross-section;

FIG. 10 shows another embodiment of a device for separating gas from liquid and discharging the separated gas; and FIG. 11 shows a device used with the device of FIG. 10 for discharging separated gas, in cross-section.

DESCRIPTION OF THE PREFERRED EMBODIMENTS

Figure 2:
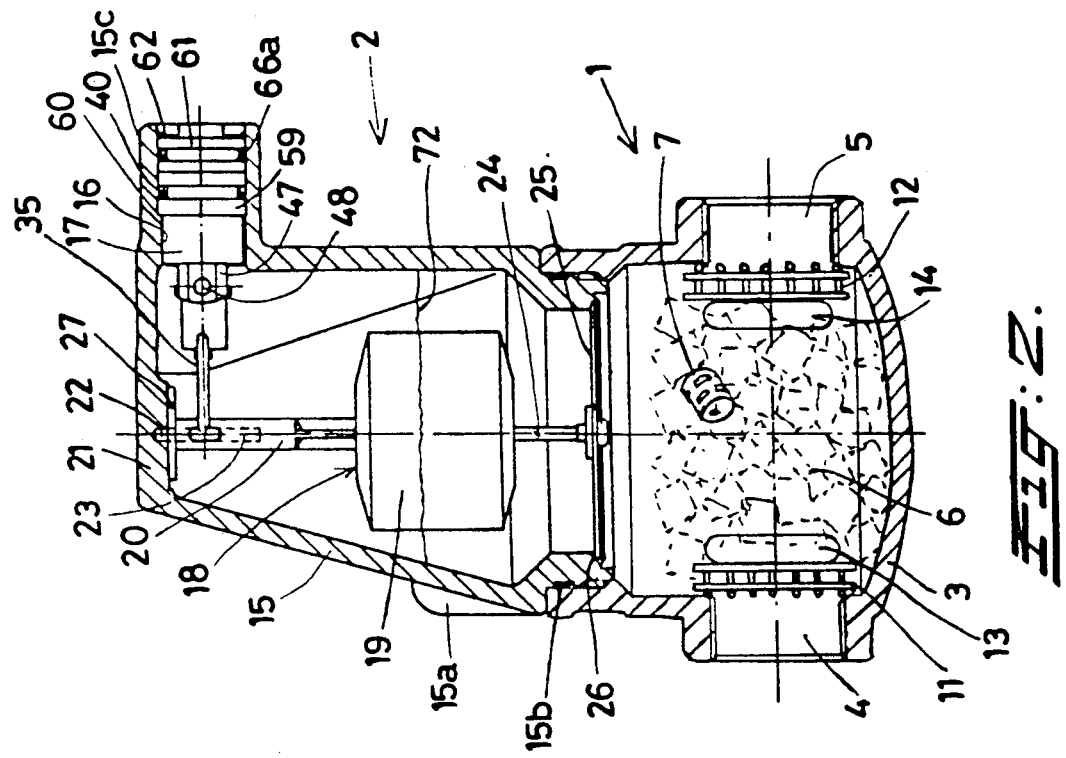
FIG. 2 is a cross-section of the device of FIG. 1.
Figure 1:
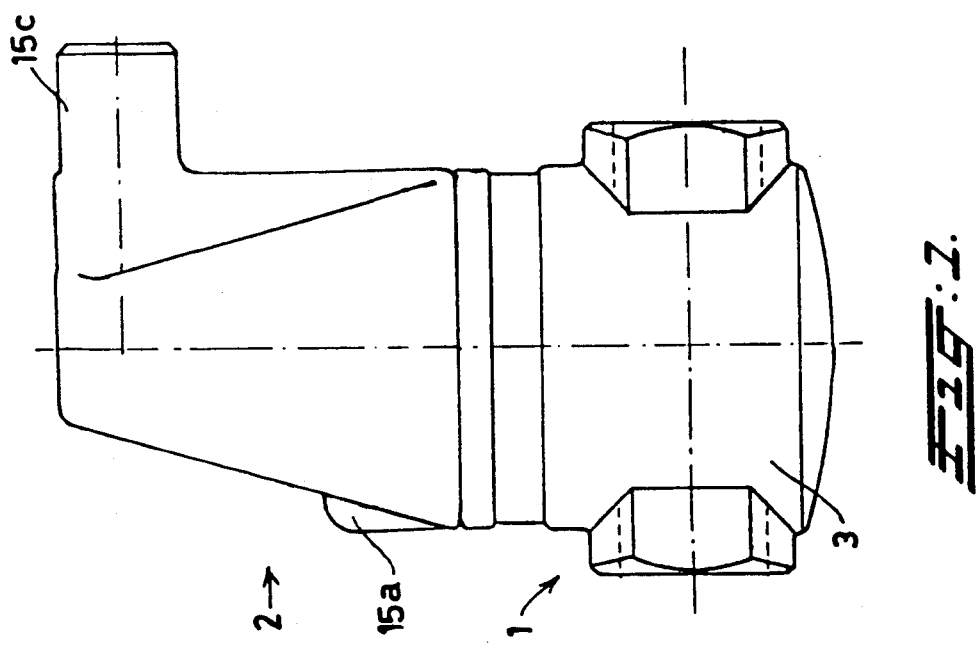
FIG. 1 is a side view of a particular embodiment of a combined device for separating a gas from a liquid and discharging the separated gas.

FIGS. 1 and 2 show a particular embodiment of a combined device for separating air from water and discharging the air which has been separated from the water. Such a device can be used in, for example, central heating plants.

The device comprises an air separator 1 and an air venting device 2 fitted on top of it. The air separator 1 comprises a housing 3 with a feed aperture 4 and a discharge aperture 5 for the water to that is de-aerated. The internal space 6 of the housing 3 is virtually completely filled with open filling elements 7, only one of which is shown, for the sake of clarity. These filling elements 7 have a large surface area relative to the volume taken up and offer only a slight resistance to liquid flowing through the housing. This is due, on the one hand, to the open structure of the filling elements 7 and, on the other hand, to the fact that the housing 3 has a considerably greater cross-sectional surface area at right angles to the direction of flow than the feed and discharge apertures 4 and 5, which means that the velocity of flow is relatively low in the housing 3. When water containing air flows through the housing 3, the air present in the water will adhere to the surface of the filling elements 7 and form little bubbles there. The small bubbles grow into larger bubbles by coalescence, until they have sufficient floating power to break away from the filling elements and rise to the surface of the water.

The filling elements are known per se, and are used in the processing industry in plants for scrubbing gases, for example removing water from air. The filling elements are used as bulk packing. Examples of such filling elements are so-called Raschig rings and Pall rings. The example of an embodiment shown here shows filling elements 7 which are shown in side view in FIG. 3a and in front view in FIG. 3b, and are the shape of hollow cylindrical elements, known per se, comprising a cylindrical wall 8 which is provided with apertures 9 and projections 10 extending inwards from the wall 8. It will be clear that any other type of open filling element with a large surface area relative to the volume taken up can be used.

In order to prevent the filling elements from disappearing out of the housing 3 through the feed aperture 4 and/or the discharge aperture 5, provision is made in front of said two apertures for grilles 11 and 12 which are clamped, for example, between the wall area of the housing 3 all round the apertures 4 and 5 and lobes 13 and 14 disposed on either side of the apertures 4 and 5 and projecting inwards from the wall of the housing 3. The apertures in these grilles 11 and 12 have dimensions which are smaller than the dimensions of the filling elements 7.

The air venting device 2 comprises a housing 15 which is open at the bottom side and is screwed onto the housing 3 of the air separator 1. The housing 15 is provided with a projecting lobe 15a, in order to give a good grip during screwing onto the housing 3. The screwed connection is sealed by means of a sealing ring 15b. At the top side the housing 15 is provided with a projection 15c with a bore 16, in which a valve 17 is fitted for discharging air which has collected in the top of the housing 15. The valve 17 is operated by a float 18 accommodated in the housing 15. The float 18 comprises a float element 19 and a vertical float rod 20 extending coaxially through the float element 19. The float rod 20 is freely movable in the axial direction. In the lateral direction the float rod is held in place by an inward-extending guide pin 22, which is fixed in the top wall 21 of the housing 15 and projects with play into an axial bore 23 in the top end part of the float rod 20, and by a second guide pin 24 which projects with play into an axial bore in the bottom end part of the float rod 20, and which is fixed on a guide plate 25 which extends over the open bottom side of the housing 15 and is fixed at the peripheral edge to the aperture edge 26 of the housing 15. The guide plate 25 is provided with large apertures (not shown) for allowing water and air from the air separator 1 to pass through the air venting device 2. The float rod 20 is provided at the top side with a valve operating element 27 in the form of a collar extending outwards and fixed to the float rod 20.

Figure 4:
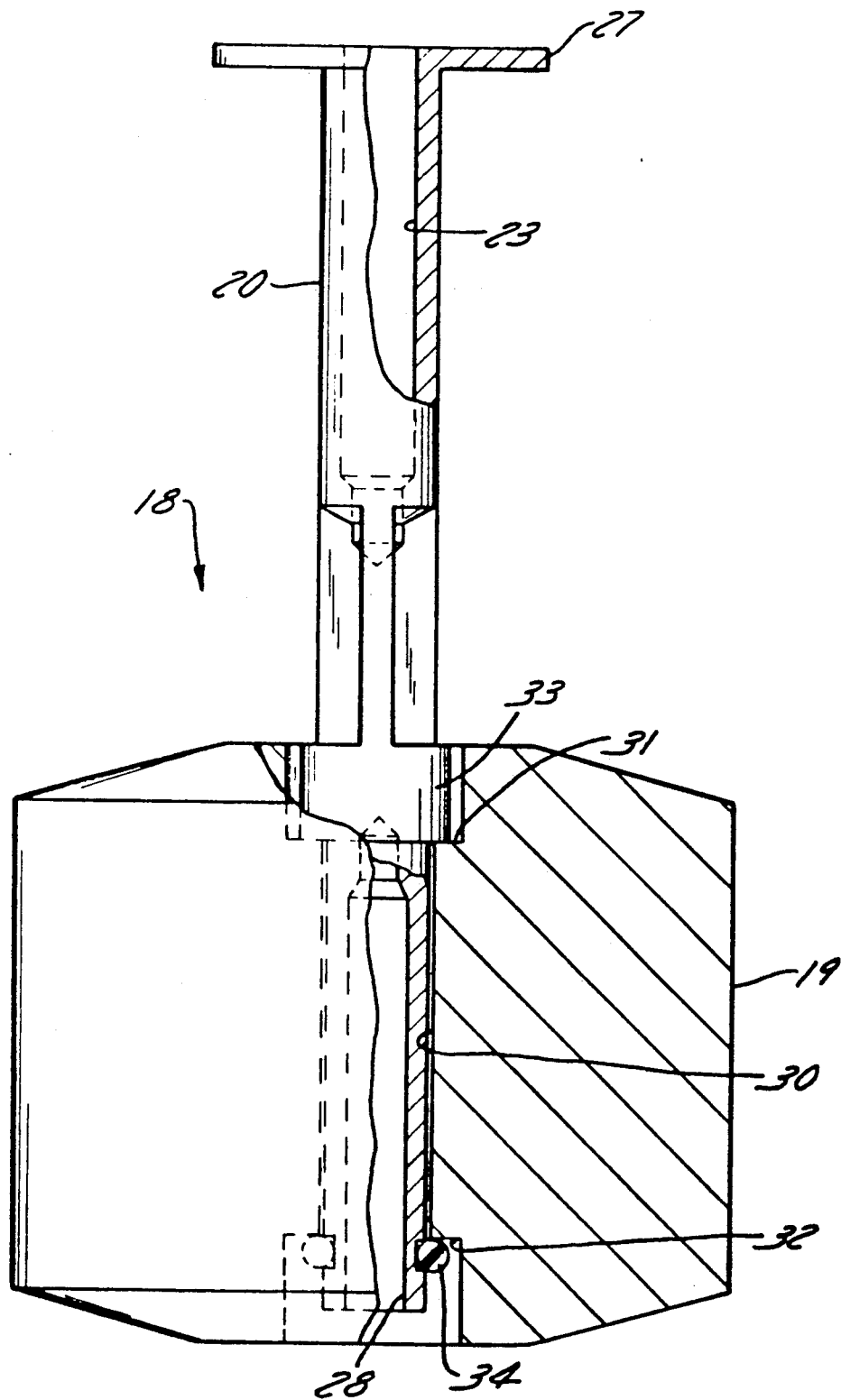
FIG. 4 shows the float used in the device of FIGS. 1 and 2, on an enlarged scale, and partially in cross-section.

FIG. 4 shows the float 18 separately on an enlarged scale, and partially in longitudinal section. The axial bore 28 provided in the bottom end part of the float rod 20 can be seen in the righthand part of FIG. 4. The manner in which the float rod 20 is fixed in the float element 19 can also be seen. The bottom end part of the float rod 20 extends through a central bore 30 into the float element 19. At the top and bottom side the diameter of the bore 30 is enlarged, which produces two stops 31 and 32. A collar 33 on the float rod 20 rests against the stop 31, while at the bottom side an O-ring 34 clamped round the bottom end of the float rod 20 rests against the bottom stop 32. In this way the float rod 20 is fixed in the axial direction relative to the float element 19.

When the air venting device is not working, the valve operating element 27 on the float rod 20 lies clear of a valve opening element 35 connected to the valve 17. The valve operating element 27 can cooperate with said valve opening element 35 for opening of the valve 17.

Figure 5:
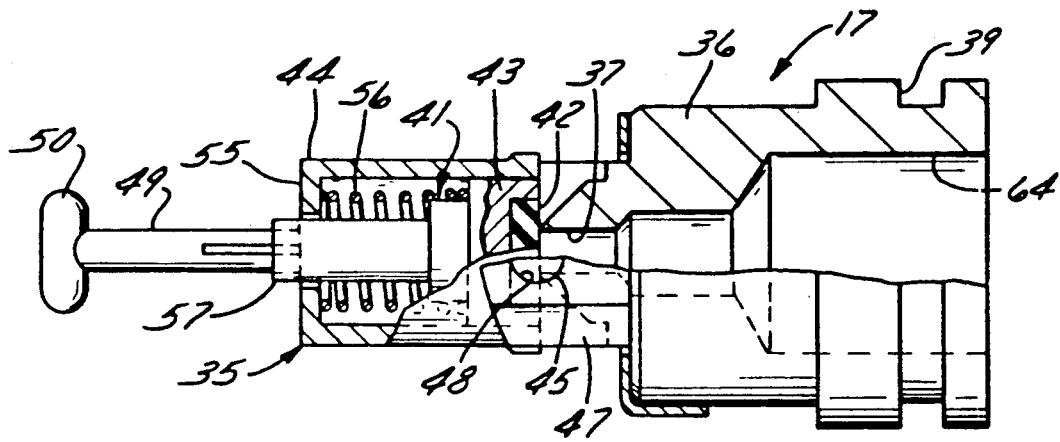
FIG. 5 shows the gas discharge valve used in the device of FIGS. 1 and 2, on an enlarged scale, and partially in cross-section.

The valve 17 fitted in the bore 16 in the housing 15 of the air venting device 2 is shown in greater detail in FIG. 5. The valve 17 comprises a valve seat 36 fitting in the bore 16 and having a central bore 37 through which air can escape when the valve is open. The valve seat 36 is provided at the outside with an annular groove 39 in which an O-ring 40 which seals against the inside wall of the bore 16 can be placed. The valve 17 also as a valve body 41 cooperating with the valve seat 36, and which includes the previously mentioned valve opening element 35. The valve body 41 comprises a valve rubber 42 which cooperates directly with the valve seat 36 and a valve rubber holder 43.

The valve opening element 35 shown in FIGS. 6a, 6b, 6c and 6d on an enlarged scale in top view (partially in cross-section), side view, front view and rear view respectively comprises a sleeve-shaped part 44 in which the valve body 41 is fitted so that it can move in the axial direction. At the end lying at the valve seat side the sleeve-shaped part 44 is hingedly connected to the valve seat 36. The hinge connection is formed by two gudgeons 45 and 46 projecting at right angles from the sleeve-shaped part 44 and lying diametrically opposite each other, and having a semi-circular cross-section, and a plate part 47 which is fixed to the seat 36 and is bent in a U-shape, and which has disposed in the legs of the U diametrically opposite apertures 48 in which the gudgeons 45 and 46 are disposed in such a way that they rotate.

At the end lying away from the valve seat the sleeve-shaped part 44 is provided with a lever 49 which extends in the lengthwise direction of the sleeve-shaped part 44, and has a free end 50 of which can cooperate with the valve operating element 27 on the float rod 20. As can be seen in FIG. 6a, the lever 49 is in the form of a fork which grips round the float rod 20, and comprises two fork arms 51 and 52 which are fixed to the sleeve-shaped part. At the free ends the fork arms 51 and 52 are provided with cross pieces 53 and 54 which stand at right angles to the plane of the fork-type lever 49, and which can cooperate with the valve operating element 27 on the float rod 20.

Between the valve body 41 and an axial end wall 55 of the sleeve-shaped part 44 situated at the side where the lever 49 is located, provision is made for a compression spring 56 which pushes the valve body 41 in the direction of the valve seat 36 and the valve opening element 35 into the rest position. The valve body 41 is also provided with an axial pin 57 which projects with some play through a central bore 58 in the end wall 55 of the sleeve-shaped part 44.

Figure 7:
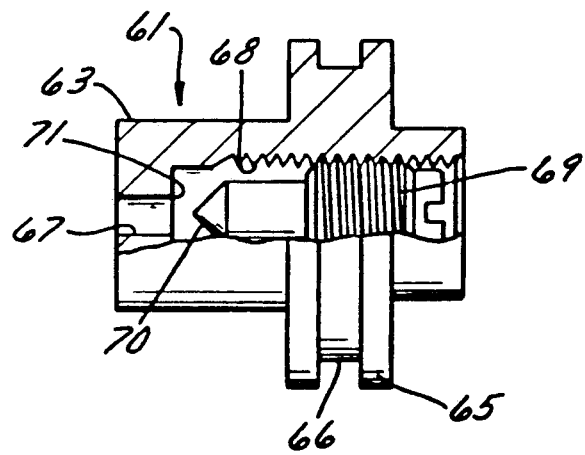
FIG. 7 shows an insert for fixing the valve of FIG. 5 in the device of FIGS. 1 and 2, partially in cross-section.

The valve 17 is fixed in the axial direction in the bore 16 in the housing 15 of the air venting device 2 through a part 59 of the valve seat 36 with enlarged diameter being confined between an annular stop 60 in the bore 16 and an insert 61 which is fixed in the bore 16 by means of a clamping ring 62. The insert 61 is shown separately in FIG. 7. The insert 61 comprises a part 63 with reduced diameter which fits into a recess 64 in the valve seat 36. A part 65 with larger diameter is provided with a peripheral groove 66 in which an O-ring 66a can be placed and seals against the wall of the bore 16 in which the insert 61 is fitted. The insert 61 is provided with a central bore 67 which connects to the bore 37 in the valve seat 36, and which has an internally threaded part 68 of larger diameter into which a pointed screw 69 is screwed. The pointed part 70 cooperates with the edge 71 of the bore 67 lying at the side where the pointed screw is provided, for regulation of the passage for the air escaping from the air venting device 2 through the bore 37 in the valve seat 36 and the bore 67 in the insert 61.

The combined air separator/air venting device described above works as follows. Water containing air fed in through the feed aperture 4 flows along the filling elements 7 in the housing 3 of the air separator 1 to the discharge aperture 5. Initially the housing 3 of the air separator 1 will be full of water, and the housing 15 of the air venting device 2 will be largely full of water. The float 18 will be pressed upwards by the upward pressure, and the valve operating element 27 rests against the top wall 21 of the housing 15 of the air venting device 2. The valve operating element 27 here is fully clear of the valve opening element 35. The air present in the water will adhere to the surface of the filling elements 7 and form small bubbles there. These bubbles will become greater until they have sufficient floating power to break away from the filling elements and rise up in the water. The air bubbles go through the large apertures in the plate 25 and rise further to the water surface 72 in the air venting device 2. As more air goes into the air venting device, the water surface 72 will fall. At a certain point in time this water surface 72 has dropped so far that the upward force on the float becomes equal to the weight thereof. At this moment the float 18 will sink with the water surface 72, and the valve operating element 27 will move in the direction of the valve opening element 35. When the float sinks further the valve operating element 27 will contact and then move the valve opening element 35 downwards, where it pivots about the hinge formed by the gudgeons 45 and 46 of the valve operating element 35 and the apertures 48 in the U-shaped part 47 connected to the valve seat 36. The valve element 41 accommodated in the sleeve-shaped part 44 is thereby tilted, which makes the valve rubber 42 move partially clear of the valve seat 36 and produces an opening through which air present in the air venting device 2 can escape from the air venting device 2 via the bore 37 in the valve seat 36 and the bore 67 in the insert 61. The water surface 72 will rise again as a result, and the valve 17 will close again through the fact that the valve opening element 35 is pressed into the rest position again by the action of the spring 56. When air is separated from the water again, the water surface 72 will sink again, and the air venting process will be repeated.

Figure 9:
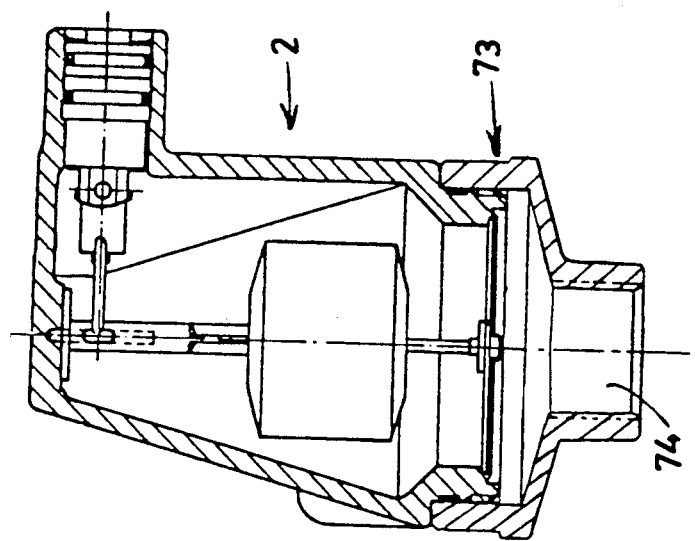
FIG. 9 is a cross-section of the device of FIG. 8.
Figure 8:
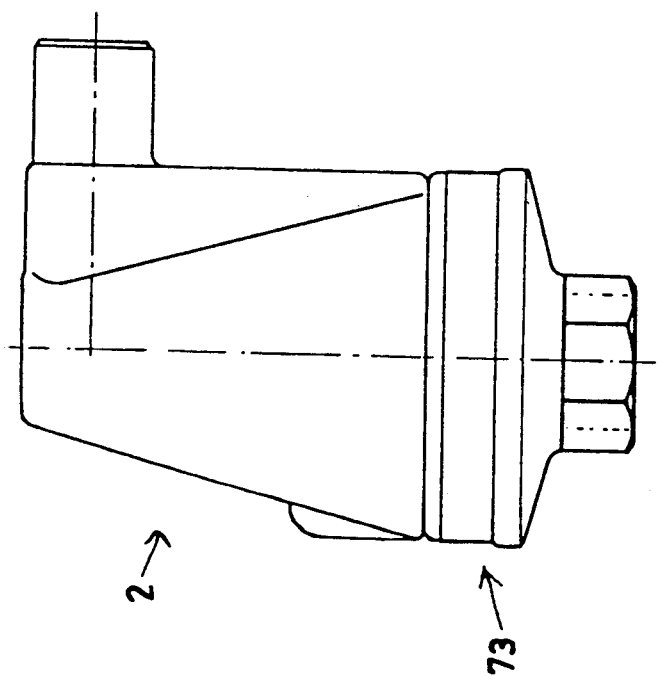
FIG. 8 is a side view of a separately used device for discharging gas from a system filled with liquid and gas.

It is not necessary for the air venting device 2 to be fitted on an air separator 1. The air venting device 2 can also be used separately, and in that case is fitted on a base 73 as shown in FIGS. 8 and 9, in the same way as on the air separator 1. For example the base 73 is provided on the bottom side with an internally threaded bore 74 by means of which the air venting device can be screwed onto a system which is filled with water and from which air is to be discharged.

FIG. 10 shows a large-capacity air separator 75 and an air venting device 76 fitted on it. The air separator 75 comprises a tank 77 which is provided with connection branches 78 and 79, which may be flanged, for the infeed and discharge of water. Like the air separator 1 of FIG. 2, the tank 77 is filled up to a particular level 80 with filling elements 7 for the separation of air from water flowing through the tank 77. The embodiment of the air venting device 76, which is shown in greater detail in FIG. 11, differs slightly from the embodiment of the air venting device 2 shown in FIG. 2. The difference essentially lies in the embodiments of the guide of the float 81. In particular, the rod 82 of the float 81 is made so long that the float element 83 lies outside the housing 84 of the air venting device 76. The float rod 82, like the float rod 20 in the air venting device 2, can move freely in the vertical direction. At the top side the float rod 82 is guided in the same way as the float rod 20. The float rod 82 is, on the other hand, positioned in the transverse direction through the fact that the float rod 82 projects with play through a central aperture 85a in a guide plate 85, which is further designed and fixed on the housing 84 of the air venting device 76 in the same way as the guide plate 25 of the air venting device 2. The float rod 82 is provided with a collar 86 in order to limit the downward movement of the float 81. The float element 83 is fixed on the float rod 82 in the axial direction by means of two O-rings 87 and 88 clamped round the float rod.

As can be seen in FIG. 10, the float element 83 projects into the tank 77 of the air separator 75. The float element 81 is surrounded by a housing 89 which connects to the air venting device 76, and the side wall of which is essentially closed, and which has an end wall 90 provided with apertures at the bottom side. By means of this housing 89 it is ensured that dirt floating on the water surface 91 in the air separator 75 cannot enter the air venting device 76. Provision is made in the side wall of housing 89 at the top side for a small aperture 92 through which air can flow, so that the pressure of the air in the housing 89 and in the air venting device 76 is always equal to the pressure of the air in the top of the air separator 75 above the water surface 91. The air separator 75 can also be provided with means (not shown here) for the removal of dirt floating on the water surface. The tank 77 is provided with a drain hole 93 at the bottom side.

In all embodiments of the air venting device shown and described the internal transverse dimensions of the housing of the air venting device decrease from the open bottom side of the housing towards the top side, and the air discharge valve is provided in the top of the housing. In particular, the housing of the air venting device is essentially the shape of a truncated cone. This means that when there is an increase in the pressure of the water in the system to which the air venting device is connected the water level in the air venting device rises less than in the case where the internal transverse dimensions of the housing of the air venting device are the same over the height. The air discharge valve consequently remains further away from the water surface, which reduces the risk of soiling of the valve.

The moving parts of the air venting device are preferably made of light, corrosion-resistant material. For example, the float and the float rod are made of plastic, in particular polypropylene, and the valve opening element is also made of plastic, in particular polyacetal (POM). These plastic parts can be made relatively simply by injection moulding.

Various other embodiments of air separator and air venting device are, of course also possible within the scope of the invention. For example, the air discharge valve and the float can be designed differently. The air discharge valve could possibly also be fitted in the top wall of the air venting device.

The use of the air separator and air venting device described is not restricted to the discharge of air from systems containing water and air, such as, e.g., central heating systems. The device shown can in general be used as a device for the separation of gas from liquid and the discharge of the separated gas.

The gas separator according to the invention with the open filling elements present in the housing has the advantage that a very good gas separation is achieved, and the resistance which the liquid flowing through the gas separator experiences from the filling elements is very low.

The advantages of the gas discharge device according to the invention can be summarized as follows.

The device is reliable. Due to the fact that there is contact between the float and the valve opening element only at the moment when the valve has to be opened for the discharge of gas, the valve is not influenced by the float for the remainder of the time. If there were constant contact between the float and the opening element, the movement of the water would constantly open the valve slightly, so that there would be a constant discharge of gas. This could make the liquid level rise to the valve, which would produce a great risk of soiling of the valve, thereby causing it to leak. In the gas discharge device the level of the liquid surface is virtually constant, so that the distance between the valve and the liquid surface is also virtually constant, which thus makes the risk of soiling of the valve slight.

What is claimed is:

1. A device for separating gas from liquid, in particular for separating air from water, for use in a liquid circulation system through which a gas-containing liquid flows, comprising:
    a housing means including bottom and side walls defining an enclosed internal space having lower and upper regions, a liquid infeed aperture in said housing side walls for admitting liquid that is to be degassed into said lower region, a liquid discharge aperture in said housing side walls for discharging liquid from said lower region that has been degassed, and a closable gas discharge aperture in said housing walls of said upper region for discharging separated gas from said upper region during operation;
    a plurality of discrete filling elements randomly disposed to partially fill said lower region of said housing means, each of said filling elements having a large surface area relative to its volume to provide surface structure on which gas can adhere and coalesce into bubbles until they have sufficient floating power to break away and rise into said upper region; and
    a grill means in said housing for preventing said discrete filling elements from passing out of said lower region through said liquid infeed and discharge apertures.

2. The device according to claim 1, wherein said filling elements comprise essentially cylindrical hollow elements, including a cylindrical wall provided with apertures and projections extending inwards from said wall;

3. The device according to claim 1, wherein said liquid infeed aperture and said liquid discharge apertures are each covered by a grille having openings, the dimension of said openings being smaller than the dimensions of said filling elements contained in said housing means.

4. A device for discharging gas from a closed system containing a mixture of liquid and gas, and in particular for discharging air separated from a water and air mixture contained in the closed system comprising:
    a housing means including, top, bottom and side walls defining an internal space, a gas receiving opening in said housing walls connectable to admit gas separated from said gas and liquid mixture in said system into said internal space, and a gas discharge aperture in said housing walls for discharging gas out of said internal space;
    a gas venting valve mounted in said gas discharge aperture, said gas venting valve having a closable opening and a valve body movable from a normally closed position relative to said closable opening to an open position;
    a valve opening element operatively connected to move said valve body between said open and closed positions; and
    an operating means for moving said valve opening element mounted in said housing including a float element, a float rod secured to said float element and having top and bottom end parts, float rod guide elements in said housing on which said float rod top and bottom end parts are slidably mounted to reciprocate freely, and a valve operating element on said float rod and movable therewith between a non-working position wherein said valve operating element is out of contact with said valve opening element allowing said valve body to remain in said normally closed position and a working position is contact with said valve operating element to move said valve body to said open position, said non-working position preventing contact between said valve operating element and said valve opening element until said float and rod have moved a predetermined distance 5. The device according to claim 4, wherein said gas receiving opening is spaced downward from said top wall and said housing has internal transverse dimensions that decrease from said gas receiving opening toward said top wall thereof, and in that said gas venting valve is fitted in said top of said housing; said housing being essentially in the shape of a truncated cone.

6. The device according to claim 4, wherein one of said float rod guide elements includes a first axial bore in said top end part of said float rod and a first guide pin which extends inwards from said top wall of said housing, and which projects with play into said first axial bore in said top end part of said float rod during operation.

7. The device according to claim 6, wherein said float element is inside the housing, and the other of said guide rod elements includes a guide plate having openings therein mounted in said housing over said gas receiving opening, and a second axial bore in the bottom end part of said float rod, said guide plate provided with a second guide pin which extends toward said internal space of said housing, and which projects with play into said second axial bore in the bottom end part of the float rod during operation.

8. The device according to claim 4, wherein said gas venting valve has a valve seat and a central bore mounted in said gas discharge aperture, said valve body cooperating with said valve seat to open and close said central bore, and wherein said valve opening element includes: a lengthwise extending sleeve-shaped part having an end wall and in which said valve body is reciprocally mounted; one end; and a free end; said sleeve-shaped part one end lying adjacent where said valve seat is located hingedly connected to said valve seat, and said free end provided with a lever that extends in said lengthwise direction of said sleeve-shaped part. said free end cooperable with said valve operating element on said float rod; and a spring mounted between said valve body and said end wall of said sleeve-shaped part normally biasing said valve body in the direction of the valve seat.

9. The device according to claim 8, wherein said lever is in the form of a fork having arms, which are around said float rod, and said valve operating element comprises a collar which is mounted on said float rod to extend transversely thereto in spaced relation, above said fork, and which will contact said fork arms after predetermined travel of said float rod.

10. A device for separating gas from liquid, for use in a liquid circulation system through which a gas containing liquid flows comprising:
   a housing means including bottom, top and side walls defining are enclosed internal space having lower and upper regions, a gas receiving opening in said walls for passing separated gas from said lower to said upper region, a liquid infeed aperture in said walls for admitting liquid that is to be degassed into said lower region; a liquid discharge aperture in said walls for discharging liquid from said lower region that has been degassed, and a gas discharge aperture in said walls for discharging separated gas from said upper region during operation;
   a plurality of discrete filling elements randomly disposed in said housing means to partially fill it, each of said filling elements having a large surface area relative to its volume to provide surface structure on which gas can adhere and coalescence into bubbles which increase in size until they have sufficient floating power to break away and rise into said upper region;
   a gas venting valve mounted in said gas discharge aperture said gas venting valve having a closable opening and a valve body movable from a normally closed position relative to said closable opening to an open position;
   a valve opening element operatively connected to move said valve body between said open and normally closed positions; and
   a valve operating means in said housing for moving said valve opening element to said open position.

11. A device for separating gas from liquid, for use in a liquid circulation system through which a gas containing liquid flows comprising:
   a housing means including bottom, top and side walls defining are enclosed internal space having lower and upper regions, a gas receiving opening in said walls for passing separated gas from said lower to said upper region, a liquid infeed aperture in said walls for admitting a liquid that is to be degassed into said lower region; a liquid discharge aperture in said walls for discharging liquid from said lower region that has been degassed, and a gas discharge aperture in said walls for discharging separated gas from said upper region during operation;
   a plurality of discrete filling elements randomly disposed in said housing means to partially fill it, each of said filling elements having a large surface area relative to its volume to provide surface structure on which gas can adhere and coalescence into bubbles which increase in size until they have sufficient floating power to break away and rise into said upper region;
   a gas venting valve mounted in said gas discharge aperture said gas venting valve having a closable opening and valve body movable from a normally closed position relative to said closable opening to an open position;
   a valve opening element operatively connected to move said valve body between said open and normally closed positions; and
   a valve operating means in said housing for moving said valve opening element to said open position; said valve operating means including a float element, a float rod secured to said float element and having top and bottom end parts, first and second float rod guide elements for mounting said float rod to reciprocate freely, and a valve operating element on said float rod and movable therewith between a non-working position wherein said valve operating element is out of contact with said valve opening element to allow said valve body to remain in said normally closed position and a working position in contact with said valve operating element to move said valve body to said open position, said non-working position preventing contact between said valve operating element and said valve opening element until aid float and rod have moved a predetermined distance.

12. The device according to claim 11, wherein said upper region of said housing has internal transverse dimensions that decrease from said bottom wall end toward said top wall thereof, and in that said gas venting valve is fitted in said top of said housing; said housing being essentially in the shape of a truncated cone.

13. The device according to claim 11, wherein one of said float rod guide elements includes a first axial bore in said top end part thereof and a first guide pin which extends inwards from said top wall of said housing, and which projects with play into said first axial bore in said top end part of said float rod during operation.

14. The device according to claim 13, wherein said float element is inside the housing, and the other of said float rod guide rod elements includes a guide plate having openings therethrough mounted in said housing over said gas receiving opening and, a second bore in said bottom end part of said float rod, said guide plate provided with a second guide pin which extends toward said internal space of said housing, and which projects with play into said second axial bore in the bottom end part of the float rod during operation.

15. The device according to claim 11, wherein said gas venting valve body has valve seat and a central bore and is mounted in said gas discharge aperture, said valve body cooperating with said valve seat to open and close said central bore, and wherein said valve opening element includes: a lengthwise extending sleeve-shaped part having an end wall and in which said valve body is reciprocally mounted; on end; and a free end; said sleeve-shaped part one end lying adjacent where said valve seat is located hingedly connected to said valve seat, and said free end provided with a lever that extends in said lengthwise direction of said sleeve-shaped part, said free end cooperable with said valve operating element on said float rod; and a spring mounted between said valve body and said end wall of said sleeve-shaped part normally biasing said valve body in the direction of the valve seat.

16. The device according to claim 15, wherein said lever is in the form of a fork having arms, which are around said float rod, and said valve operating element comprises a collar which is mounted on said float rod to extend transversely thereto in spaced relation, above said fork, and which will contact said fork arms after predetermined travel of said float rod.

* * * * *